United States Patent [19]
Seo

[11] Patent Number: 5,992,749
[45] Date of Patent: Nov. 30, 1999

[54] DATA SYMBOL READER

[75] Inventor: Shuzo Seo, Tokyo, Japan

[73] Assignee: Asahi Kogaku Kogyo Kabushiki Kaisha, Tokyo, Japan

[21] Appl. No.: 08/806,402

[22] Filed: Feb. 26, 1997

[30] Foreign Application Priority Data

Mar. 1, 1996 [JP] Japan ................................. 8-071359
Mar. 1, 1996 [JP] Japan ................................. 8-071360

[51] Int. Cl.⁶ ................................................. G06K 7/10
[52] U.S. Cl. ....................................... 235/472; 235/467
[58] Field of Search ................................. 235/472, 467

[56] References Cited

U.S. PATENT DOCUMENTS

| 4,818,856 | 4/1989 | Matushita ............... 235/472 |
| 5,428,212 | 6/1995 | Tani et al. . |
| 5,574,272 | 11/1996 | Seo et al. . |
| 5,576,527 | 11/1996 | Sawanobori . |
| 5,589,678 | 12/1996 | Atsumi et al. . |
| 5,600,116 | 2/1997 | Seo et al. . |

*Primary Examiner*—Harold Pitts
*Attorney, Agent, or Firm*—Greenblum & Bernstein, P.L.C.

[57] ABSTRACT

A data symbol reader includes a reading head which is positionable on a data symbol to be read, in which the reading head is provided with an opening for surrounding the data symbol when the reading head is positioned on the data symbol. At least one light emitter is provided for emitting light toward the opening to illuminate the data symbol and an image pick-up device is provided on which an image of the data symbol illuminated by the at least one light emitter is to be formed. A window through which the data symbol can be seen is provided and a light-splitting optical system is positioned between the opening and the window for splitting light incident on the light-splitting optical system which has passed through the opening into two beams. One of the two beams of light is received by the image pick-up device and that the other of the two beams of light is directed to the window, wherein the one of the two beams of light includes at least a part of the light emitted by the at least one light emitter.

26 Claims, 7 Drawing Sheets

A Pulse of Light

An Exposure of Image Pick-up Device

DATA SYMBOL READER

BACKGROUND OF THE INVENTION

1. Field of the Invention

The present invention relates to a data symbol reader for reading a coded data symbol such as a bar code.

2. Description of the Related Art

A bar code reader (data symbol reader) is generally used in a POS (point of sale) system. The bar code reader is provided with a light emitter which emits light to a bar code (data symbol) to be read by the bar code reader. The light reflected by the bar code is received by an image pick-up device after passing through an optical system. The bar code is usually printed on a piece of paper, a surface of a package or a container of goods, etc.

When the bar code reader is used to read such a bar code, a reading head of the bar code reader, from which the light emitted from the aforementioned light emitter is outwardly discharged, must be adequately positioned relative to the bar code so as to precisely read the data of the bar code. If the reading head of the bar code reader is not adequately positioned relative to the bar code to be read, the bar code reader cannot properly read the data of the bar code, resulting in a reading error.

SUMMARY OF THE INVENTION

The primary object of the present invention is to provide a data symbol reader having a reading head that can be easily positioned relative to a data symbol to be read by the data symbol reader, which prevents the occurrence of a reading error during a process of reading the data of the data symbol.

To achieve the object mentioned above, according to an aspect of the present invention, there is provided a data symbol reader which includes a reading head which is to be positioned on a data symbol to be read, the reading head being provided with an opening for surrounding the data symbol when the reading head is positioned on the data symbol; at least one light emitter for emitting light toward the opening to illuminate the data symbol; an image pick-up device on which an image of the data symbol illuminated by the at least one light emitter is to be formed; a see-through window through which the data symbol can be seen; and a light-splitting optical system positioned between the opening and the see-through window for splitting the light incident on the light-splitting optical system which has passed through the opening into two paths of light, in a manner such that one of the two paths of light is received by the image pick-up device and that the other of the two paths of light is led to the see-through window, wherein the one of the two paths of light includes at least a part of the light emitted by the at least one light emitter.

The at least one light emitter may consist of a single light emitter. The single light emitter may be an LED.

Preferably, the image pick-up device is comprised of a CCD line sensor.

Preferably, the see-through window is comprised of a transparent plate.

Preferably, the light-splitting optical system splits the light incident on the light-splitting optical system which has passed through the opening into the two paths of light such that a part of the incident light having a wavelength in a predetermined range of length is received by the image pick-up device and that a remaining part of the incident light is led to the see-through window, the part of the incident light including at least the part of the light emitted by the at least one light emitter.

Preferably, the light-splitting optical system includes a half-silvered mirror which reflects the one of the two paths of light while allowing the other of the two paths of light to pass through the half-silvered mirror.

According to another aspect of the present invention, there is provided a data symbol reader which includes a reading head which is to be positioned on a data symbol to be read, the reading head being provided with an opening for surrounding the data symbol when the reading head is positioned on the data symbol; at least one light emitter for emitting light toward the opening to illuminate the data symbol; an image pick-up device on which an image of the data symbol illuminated by the at least one light emitter is to be formed; a see-through window through which the data symbol can be seen; and a light-splitting optical system positioned between the opening and the see-through window for reflecting a first part of the light emitted by the at least one light emitter which has a wavelength in a first predetermined range of length while allowing a second part of the light emitted by the at least one light emitter which has a wavelength in a second predetermined range of length to pass through the light-splitting optical system.

The at least one light emitter may be comprised of a first emitter which emits the first part of the light and a second emitter which emits the second part of the light.

The at least one light emitter may be of a type which selectively emits the first part of the light or the second part of the light.

According to yet another aspect of the present invention, there is provided a data symbol reader which includes at least one light emitter for illuminating a data symbol to be read; an image pick-up device on which an image of the data symbol illuminated by the at least one light emitter is to be formed; a light-splitting optical system for splitting the light incident on the light-splitting optical system which has passed through the opening into two paths of light, in a manner such that one of the two paths of light is received by the image pick-up device and the other of the two paths of light is lead to the see-through window, wherein the one of the two paths of light includes at least a part of the light emitted by the at least one light emitter; and a see-through window secured to a casing of the data symbol reader in a manner such that the other of the two paths of light passes through the see-through window.

The present disclosure relates to subject matter contained in Japanese Patent Applications No. 8-71359 (filed on Mar. 1, 1996) and No. 8-71360 (filed on Mar. 1, 1996) which are expressly incorporated herein by reference in their entireties.

BRIEF DESCRIPTION OF THE DRAWINGS

The invention will be described below in detail with reference to the accompanying drawings in which.

DESCRIPTION OF THE PREFERRED EMBODIMENTS

Figure 1:
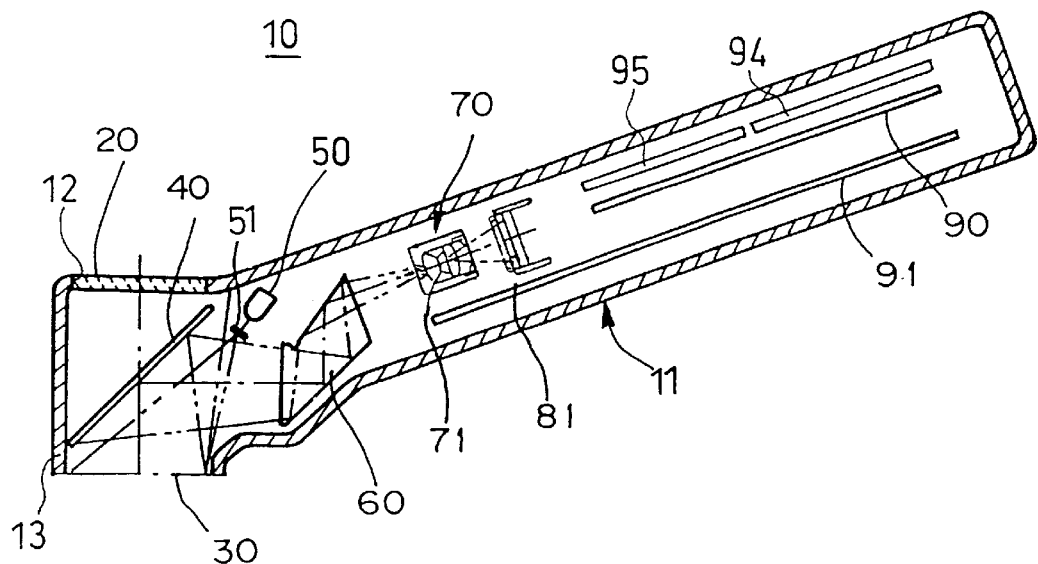
FIG. 1 is a cross-sectional view of a first embodiment of a bar code reader along line I—I shown in FIG. 2, to which the present invention is applied.
Figure 2:
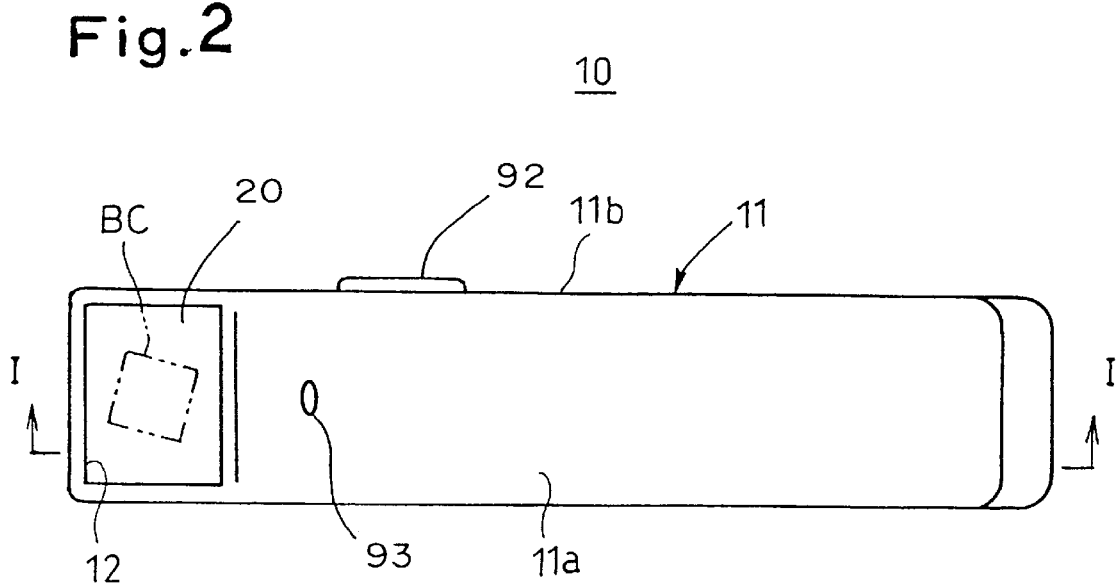
FIG. 2 is a plan view of the bar code reader shown in FIG. 1.

FIGS. 1 and 2 show a first embodiment of a bar code reader (data symbol reader) 10 to which the present invention is applied. The bar code reader 10 has a casing 11 formed substantially in the shape of a bar having a rectangular cross-sectional shape.

The bar code reader 10 is provided at one end of the casing 11 (left end as viewed in FIG. 1) with a reading head 13 having a rectangular opening 30. The reading head 13 is positioned on a bar code BC to be read (shown in FIG. 2 by a dotted line), such that the opening 30 surrounds the bar code BC when the bar code BC is read by the bar code reader 10. The bar code reader 10 is provided in the vicinity of the opening 30 with a half-silvered mirror (light-splitting optical system) 40 which is fixed to the casing 11 to be inclined at a predetermined angle relative to the opening 30. The bar code reader 10 is further provided therein with an LED (light emitter) 50 and a light diffusing plate 51 which is positioned in front of the LED 50. The LED 50 and the light diffusing plate 51 are both fixed to the casing 11. The LED 50 emits red light having a wavelength of about 660 nm (nanometers). The red light emitted from the LED 50 is diffused by the light diffusing plate 51 to be projected toward the opening 30 to illuminate the bar code BC.

The half-silvered mirror 40 is of a type which almost totally reflects light having a wavelength in a predetermined range from 630 to 690 nm (660±30 nm), while allowing light having a wavelength out of the predetermined range to almost totally pass therethrough. Therefore, light reflected by the bar code BC having a wavelength of around 660 nm that is incident on the half-silvered mirror 40 is almost totally reflected by the half-silvered mirror 40. The light reflected by the half-silvered mirror 40 is incident on a prism 60 provided in and fixed to the casing 11. It is preferable that the half-silvered mirror 40 be of a specific type which reflects over approximately 90 percent (%) of all the light having a wavelength in the aforementioned predetermined range (660±30 nm) and which allows over approximately 90 percent (%) of all light having a wavelength outside of the aforementioned predetermined range to totally pass therethrough.

The casing 11 is provided at a position opposite to the opening 30 with a rectangular opening 12 above the half-silvered mirror 40. The size of the opening 12 is a little smaller but almost the same as that of the opening 30. A transparent plate 20, serving as a see-through window, (window) is secured to the opening 12. The transparent plate 20 is made of an acrylic resin, but may be made of any other solid transparent material such as a different resin, glass, etc.

The ambient light entering the casing 11 through the transparent plate 20 partly passes through the half-silvered mirror 40 to be led to the opening 30. Almost all the ambient light having a wavelength of around 660 nm which passes through the transparent plate 20 and the half-silvered mirror 40 and which is reflected by the bar code BC is reflected by the half-silvered mirror 40 to be led to the prism 60. The remaining part of the ambient light which passes through the transparent plate 20 and the half-silvered mirror 40 and is reflected by the bar code BC again passes through the half-silvered mirror 40 to return to outside the casing 11 through the transparent plate 20.

Due to this structure, since a part of the ambient light which enters the casing 11 through the transparent plate 20 returns outwardly through the transparent plate 20 after having passed through the half-silvered mirror 40, reflected by the bar code BC and again passed through the half-silvered mirror 40, a user of the bar code reader 10 can visually confirm an area surrounded by the opening 30. Therefore, through the transparent plate 20 the user can easily visually confirm whether or not the bar code BC is positioned within the area surrounded by the opening 30 when the opening 30 is positioned relative to the bar code BC to read the same, which effectively prevents a reading error of the bar code reader 10 from occurring.

In the case that the user observes through the transparent plate 20 that a part of the bar code BC is out of the area surrounded by the opening 30, when using the bar code reader 10 to read the bar code BC, he or she only needs to shift the opening 30 a little so as to position the bar code BC within the area surrounded by the opening 30 while visually checking the position of the bar code BC relative to the opening 30 through the transparent plate 20.

The bar code reader 11 is provided on a side wall 11b of the casing 11 with a manually operable switch 92 (FIG. 2). When the switch 92 is half-depressed by the user, the LED 50 is actuated to emit red light of low luminance. While the switch 92 is held in a half-depressed state, the LED 50 continues to emit the red light of low luminance. This red light of low luminance is for merely illuminating an area surrounded by the opening 30, not for the bar code reader 10 to read the bar code BC. Namely, immediately before the opening 30 is positioned on the bar code BC, an area including the bar code BC which is to be surrounded by the opening 30 can be illuminated by the red light of low luminance by half-depressing the switch 92, which is helpful for the user to properly position the reading head 13 on the bar code BC.

An image forming optical system 70 including an image forming lens group (converging lens group) 71, and an image pick-up device 81 are provided in and fixed to the casing 11 on a right side of the prism 60 as viewed in FIG. 1. The light reflected by the half-silvered mirror 40 incident upon the prism 60 is led to the image forming optical system 70 by the prism 60. The light incident upon the image forming optical system 70 is converged to be focused on the image pick-up device 81 by the image forming lens group 71. The image pick-up device 81 may be a CCD line sensor.

The switch 92 is fully-depressed by the user for the bar code reader 10 to read the bar code BC after the user has confirmed that the bar code BC is positioned within the area surrounded by the opening 30. When the switch 92 is fully-depressed, the LED 50 is actuated to emit pulsed red light of high luminance and subsequently a reading operation of the bar code reader 10 commences. The reading operation includes a shutter operation (exposure operation) of the image pick-up device 81. The pulsed red light of high luminance emitted by the LED 50 is incident on the bar code BC, and the pulsed red light reflected by the bar code BC and having a wavelength of around 660nm is almost totally reflected by the half-silvered mirror 40 to be incident on the prism 60.

Figure 4:
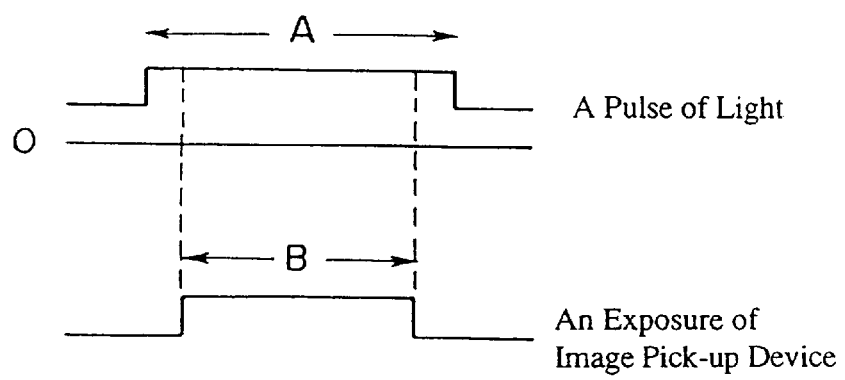
FIG. 4 is a time chart showing the time value of a single pulse of pulsed light emitted from an LED and the time value of a corresponding exposure of an image pick-up device.

FIG. 4 is a time chart showing the time value of a single pulse of the pulsed red light emitted from the LED 50 (above) and the time value of a corresponding exposure of the image pick-up device 81 (below). The image pick-up device 81 is actuated to perform an exposure operation thereof to correspond to one pulse of the pulsed red light emitted by the LED 50. As can be understood from FIG. 4, the time value (width) of one pulse of the pulsed red light of high luminance emitted by the LED 50 is predetermined such that a luminance stable section "A" of the pulse of the pulsed red light (where the luminance of light is stable) is longer than the exposure time B of the image pick-up device 81.

The bar code reader 10 is further provided in the casing 11 thereof with an image signal processing circuit 90, a decoding circuit 91, a control circuit 94 and a displaying circuit 95. Through the image signal processing circuit 90 and the decoding circuit 91, image signals obtained by the image pick-up device 81 are binary-coded and processed in a predetermined manner to be output to the control circuit 94. The control circuit 94 judges whether image data of the bar code BC has been successfully obtained in accordance with the binary-coded data of the obtained image signals, and subsequently, outputs the result of the judgement to the displaying circuit 95. The successfully obtained image data of the bar code BC is transmitted to a host computer (not shown) to which the bar code reader 10 is connected.

The bar code reader 10 is provided on an upper wall 11a of the casing 11 with an indication light 93 electrically connected to the displaying circuit 95. The displaying circuit 95 actuates the indication light 93 to emit light in accordance with the result of the judgement input from the control circuit 94. For instance, the indication light 93 may consist of a red LED and a green LED, and the displaying circuit 95 may actuate the green LED and the red LED to emit light when the results of the judgement input from the control circuit 94 are a success and a failure, respectively. Furthermore, the indication light 93 may consist of a single LED, and the displaying circuit 95 may actuate the single LED to emit continuous light and pulsed light when the results of the judgement input from the control circuit 94 are a success and a failure, respectively. Accordingly, the user of the bar code reader 10 can confirm whether or not the bar code BC has been properly read by the bar code reader 10 by seeing a lighting condition of the light emitter 93. In the case where the user confirms that the bar code BC has not yet been properly read by the bar code reader 10 by seeing a lighting condition of the light emitter 93, the user has to again visually confirm whether or not the bar code BC is adequately positioned within the area surrounded by the opening 30 through the transparent plate 20, and again fully depresses the switch 92 after the user has confirmed that the bar code BC is adequately positioned within the aforementioned surrounded area.

Figure 3:
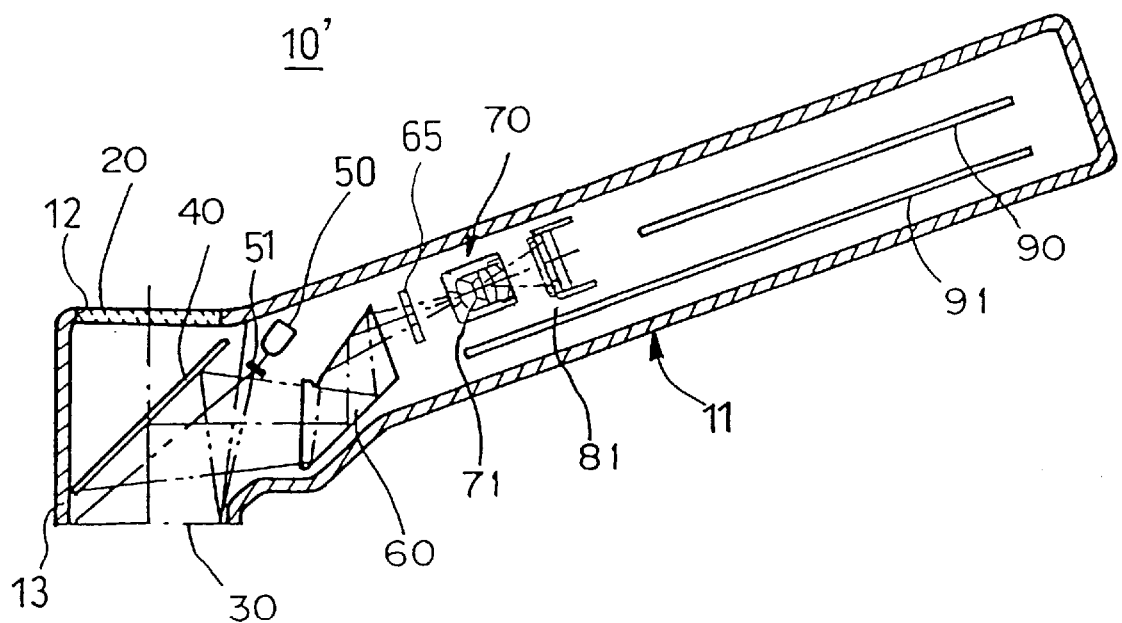
FIG. 3 is a second embodiment of a bar code reader to which the present invention is applied.

FIG. 3 shows a second embodiment of a bar code reader 10' to which the present invention is applied. The bar code reader 10' is the same as the bar code reader 10 of the first embodiment except that a filter 65 consisting of one or more than one filters is fixedly positioned between the prism 60 and the image forming optical system 70. The filter 65 allows only light having a wavelength of approximately 660 nm to pass therethrough. With this filter 65, even if a part of ambient light from the transparent plate 20 is incident on the prism 60, all the light having a wavelength substantially different than 660 nm is intercepted by the filter 65, which prevents image signals obtained by the image pick-up device 81 from suffering from noise and thus prevents the control circuit 94 from having an undesirable processing. Furthermore, although a part of ambient light is reflected on the half-silvered mirror 40 to be incident on the prism 60, a reading process for reading the bar code BC can be accurately carried out since no light having a wavelength substantially different than 660 nm is reflected on the half-silvered mirror 40 to be incident on the prism 60.

In the above first and second embodiments, the half-silvered mirror 40 is formed of a type which almost totally reflects light that has a wavelength in a predetermined range from 630 to 690 nm (660±30 nm), while allowing light having a wavelength outside of the aforementioned predetermined range to almost totally pass therethrough, as noted before. Instead of adopting the half-silvered mirror 40 formed in the above-mentioned manner, the half-silvered mirror 40 may be formed as a different type of half-silvered mirror 40 which reflects about 50 percent (%) of all the light having a wavelength in a predetermined range from 630 to 690 nm (660±30 nm) while allowing all of the remaining part of the light to pass therethrough. With this type of half-silvered mirror 40, the light emitted from the LED 50 and incident on the bar code BC partly passes through the half-silvered mirror 40 to proceed outwardly through the transparent mirror 20, so that a part of light emitted from the LED 50 can be used for the user to visually confirm the position of the bar code BC relative to the opening 30 through the transparent plate 20. Therefore, when the user desires to visually confirm the position of the bar code BC relative to the opening 30 through the transparent plate 20, even if ambient light is low (dark) which makes it difficult for the user to see the bar code BC through the transparent plate 20, the bar code BC can be illuminated by the red light of low luminance emitted from the LED 50 by depressing the switch 92 halfway. In this case where the aforementioned different type of half-silvered mirror 40 is used, the LED may be actuated to emit pulsed red light of low luminance, not continuous red light of low luminance, when the switch 92 is half-depressed, which consumes less electricity of a power source (not shown) of the bar code reader 10.

In the above first and second embodiments, the LED 50 is used which emits red light having a wavelength of about 660 nm. However, instead of the LED 50, a different LED can be used which emits light having a wavelength different from approximately 660 nm.

Figure 5:
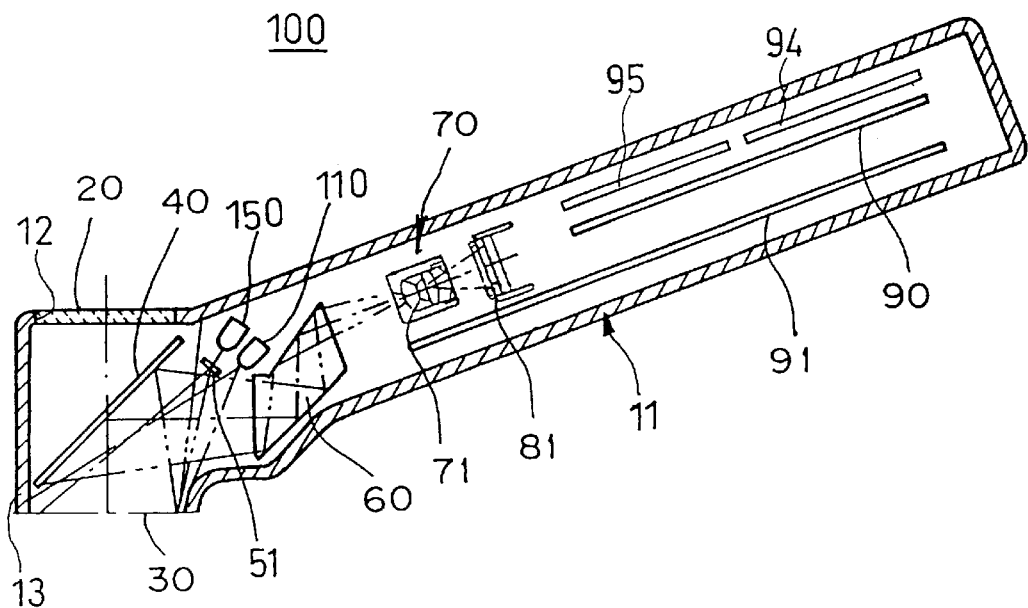
FIG. 5 is a cross-sectional view of a third embodiment of a bar code reader along line V—V shown in FIG. 6.
Figure 6:
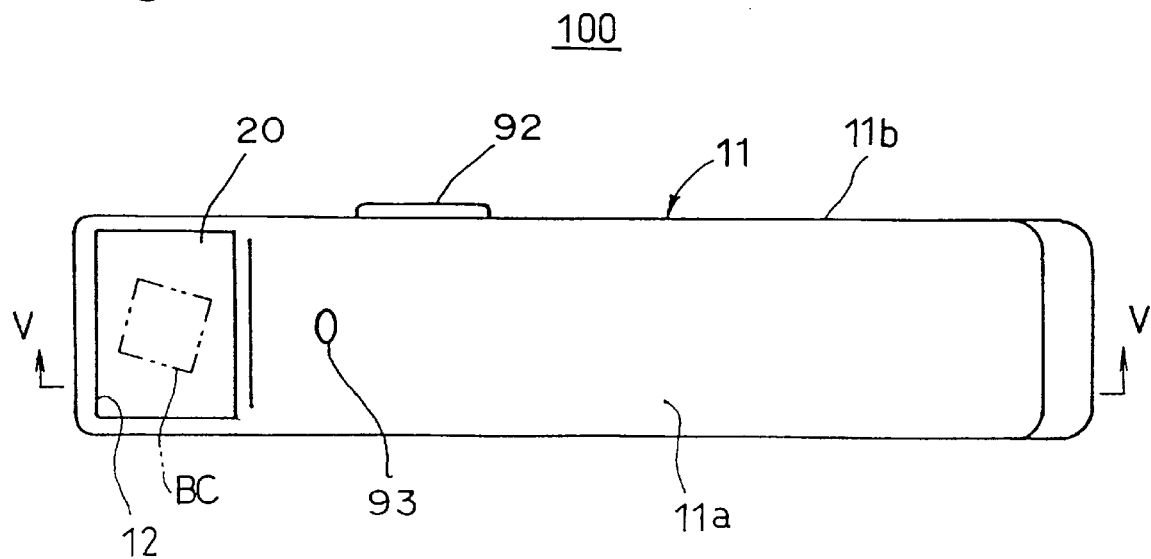
FIG. 6 is a plan view of the bar code reader shown in FIG. 5.

FIGS. 5 and 6 show a third embodiment of a bar code reader 100 to which the present invention is applied. The structure of the bar code reader 100 is substantially the same as that of the bar code reader 10 of the first embodiment. Therefore, regarding the structure of the bar code reader 100, only those areas unique to the third embodiment will be hereinafter discussed.

In the third embodiment, instead of the LED 50 of the first embodiment, a first LED 150 is used which emits red light having a wavelength of about 650 nm. In the vicinity of the first LED 150, a second LED 110 is provided fixed inside the casing 11. The second LED 110 emits green light having a wavelength of about 520 nm toward the opening 30.

The half-silvered mirror 40 in the third embodiment is formed as a different type of half-silvered mirror from the half-silvered mirror 40 in the above first embodiment. That is, the half-silvered mirror 40 in the third embodiment almost totally reflects light having a wavelength in a first predetermined range of 620 to 680 nm (650±30 nm), while allowing light having a wavelength in a second predetermined range of 490 to 550mn (520±30 nm) to almost totally pass therethrough. Therefore, light emitted from the second LED 110 and reflected by the bar code BC to be incident on the half-silvered mirror 40 almost entirely passes through the half-silvered mirror 40 to proceed outwardly through the transparent plate 20. It is preferable that the half-silvered mirror 40 in the third embodiment be of a specific type which reflects over approximately 90 percent (%) of all the light having a wavelength in the aforementioned predetermined range (650±30 nm) while allowing over approximately 90 percent (%) of all light having a wavelength outside of the aforementioned predetermined range to totally pass therethrough.

Figure 7:
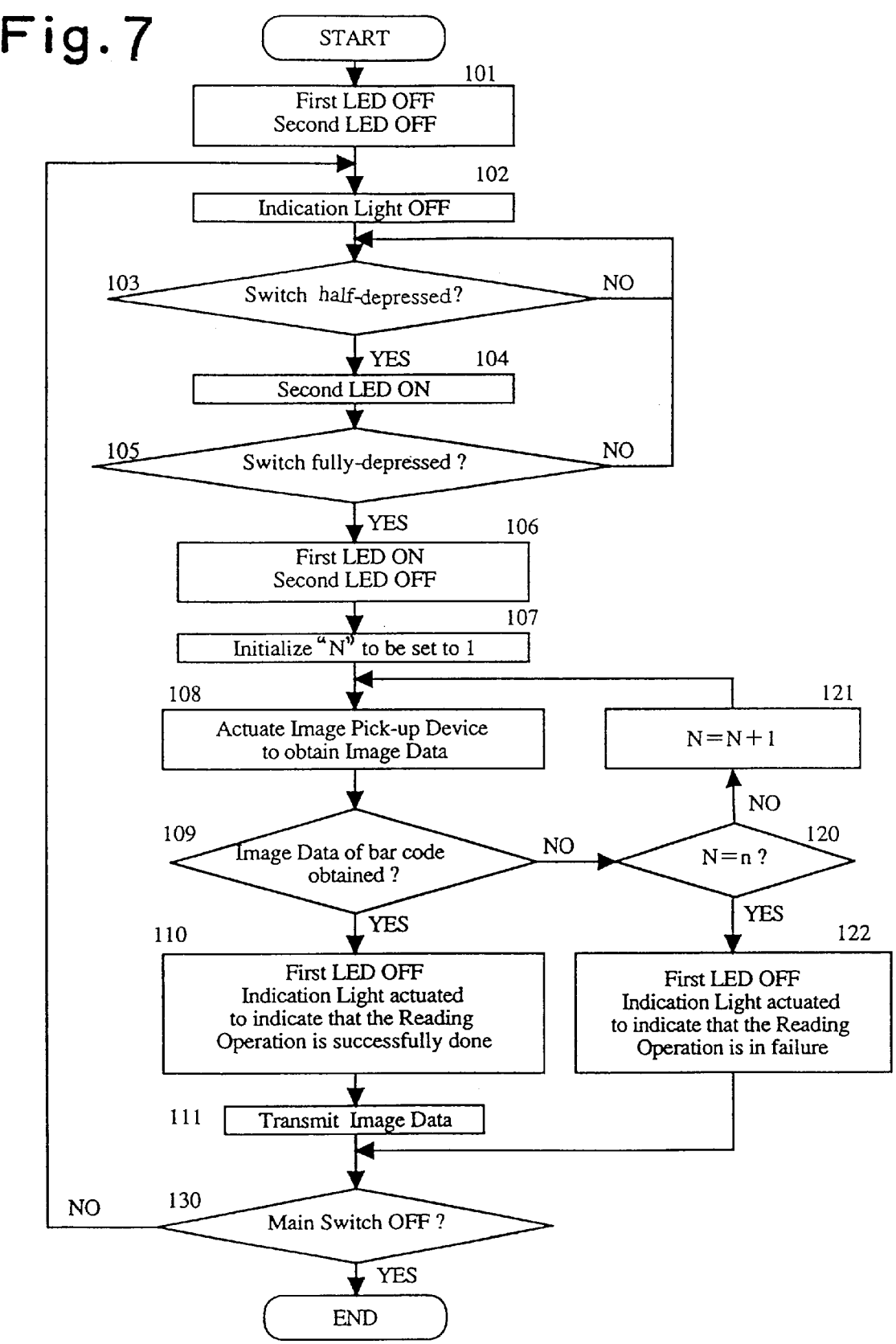
FIG. 7 is a flow chart showing operations performed in the bar code reader of the third embodiment.

FIG. 7 is a flow chart showing operations performed in the bar code reader 100. When a main switch (not shown) of the bar code reader 100 is turned ON, the operations shown in FIG. 7 start from step S101. At step S101 an initializing operation is performed in which the first and second LEDs 150 and 110 are both turned OFF. Subsequently, at step S102 the indication light 93 is turned OFF.

At step S103 it is judged whether or not the switch 92 is half-depressed. Control proceeds to step S104 if it is judged at step S103 that the switch 92 is half-depressed. The operation of step S103 continues to be performed if it is judged at step S103 that the switch 92 is not yet half-depressed.

At step S104 the LED 110 is turned ON to emit green light so as to illuminate an area to be surrounded by the opening 30. The light emitted from the second LED 110 and reflected on the area surrounded by the opening 30 passes through the half-silvered mirror 40 to proceed outwardly through the transparent plate 20, so that the user can easily visually confirm whether or not the bar code BC is positioned within the area surrounded by the opening 30 when the opening 30 is positioned relative to the bar code BC to read the same even if ambient light is dark, which effectively prevents a reading error of the bar code reader 100 from occurring.

At step S105 it is judged whether or not the switch 92 is fully-depressed. Control proceeds to step S106 if it is judged at step S105 that the switch 92 is fully-depressed. Control proceeds to step S103 if it is judged at step S105 that the switch 92 is not fully-depressed.

At step S106 the second LED 110 is turned OFF and at the same time the first LED 150 is turned ON. Subsequently, at step S107 a variable "N" which represents the number of counts of the reading operation is initialized to be set to "1". At step S108 the reading operation commences. Namely, the image pick-up device 81 is actuated, and through the image signal processing circuit 90 and the decoding circuit 91 image signals obtained by the image pick-up device 81 are binary-coded and processed in a predetermined manner to be output to the control circuit 94.

At step S109 it is judged whether or not image data of the bar code BC has been successfully obtained in accordance with the binary-coded data of the obtained image signals. Control proceeds to step S110 if it is judged at step S109 that the image data of the bar code BC has been successfully obtained. Control proceeds to step S120 if it is judged at step S109 that the image data of the bar code BC has not been successfully obtained.

At step S110 the first LED 150 is turned OFF and subsequently the indication light 93 is actuated to emit light so as to visually inform the user that the reading operation is successfully complete. At step S111 the image data of the bar code BC successfully obtained is transmitted to a host computer (not shown) to which the bar code reader 100 is connected.

At step S120, it is judged whether or not the number of the variable "N" is equal to a number "n". The number "n" is predetermined to be more than "1" and is stored in the control circuit 94. Control proceeds to step S121 if it is judged at step S120 that the number of the variable "N" is not equal to the number "n", i.e., the number of the variable "N" has not yet reached the number "n". Control proceeds to step S122 if it is judged at step S120 that the number of the variable "N" is equal to the number "n", i.e., the number of the variable "N" has reached the number "n".

At step S121 the number of the variable "N" is increased by "1" and subsequently control proceeds to step S108. At step S122 the first LED 150 is turned OFF and subsequently the indication light 93 is actuated to emit light so as to visually inform the user that the reading operation has ended in failure. As can be understood from the foregoing, in the operations performed in the bar code reader 100, the reading operation is considered a failure in the case where the image data of the bar code BC cannot be successfully obtained by the time the reading operation has been repeated "n" number of times. For instance, in the case where the number "n" is "4", the reading operation is successful if the image data of the bar code BC is successfully obtained before the number of the variable "N" becomes four, and the reading operation is a failure once the number of the variable "N" becomes four.

At step S130 it is checked whether or not the main switch of the bar code reader 100 is OFF, and control ends if it is checked that the main switch of the bar code reader 100 is OFF, or control returns to step S102 if it is checked that the main switch of the bar code reader 100 remains ON.

Figure 8:
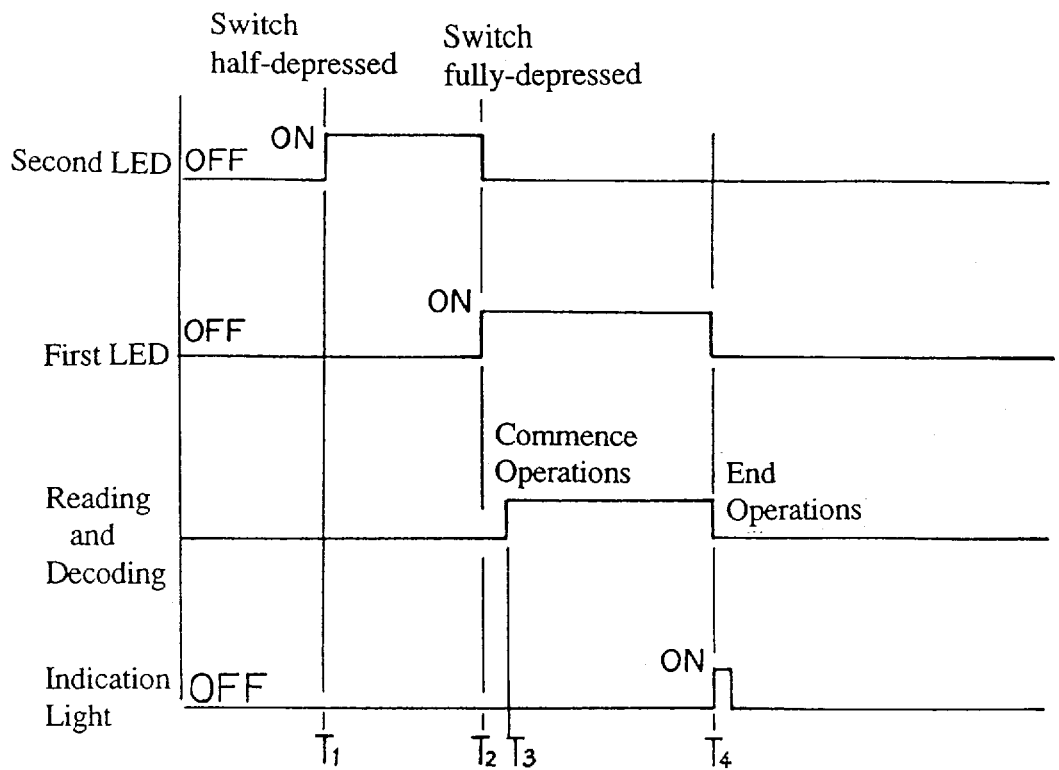
FIG. 8 is a time chart illustrating ON/OFF control of two LEDs provided in the bar code reader of the third embodiment.

FIG. 8 shows a time chart illustrating ON/OFF control of the first and second LEDs 150, 110. When the switch 92 is half-depressed, the second LED 110 is turned ON (T1). When the switch 92 is fully-depressed, the second LED 110 is turned OFF and at the same time the first LED 150 is turned ON (T2). Soon after the LED 150 is turned ON, predetermined operations (the operations at steps S106 through S109, step S120 and step S121) including the reading operation are performed (T3). When the predetermined operations end, the first LED 150 is turned OFF and simultaneously the indication light 93 is actuated to emit light in a manner to inform the user whether the result of the reading operation is successful or not (T4).

In the third embodiment, the half-silvered mirror 40 may be formed as a different type which reflects about 50 percent (%) of the green light emitted by the second LED 110 while allowing the remaining part of the light emitted by the second LED 110 to pass therethrough. In the case of such a different type of half-silvered mirror 40 being used, it is preferable to control the second LED 110 to continue to be ON when and after the switch 92 is fully-depressed. According to such an arrangement, a part of light emitted from the second LED 110 can also be used for the reading operation, that is, for illuminating an area surrounded by the opening 30 while the first LED 150 is illuminating the same simultaneously during the reading operation, thus the bar code BC can be illuminated by a brighter light. In this case, the first LED 150 may be an LED which emits red light of low luminance, which consumes less electricity of a power source (not shown) of the bar code reader 100.

Figure 9:
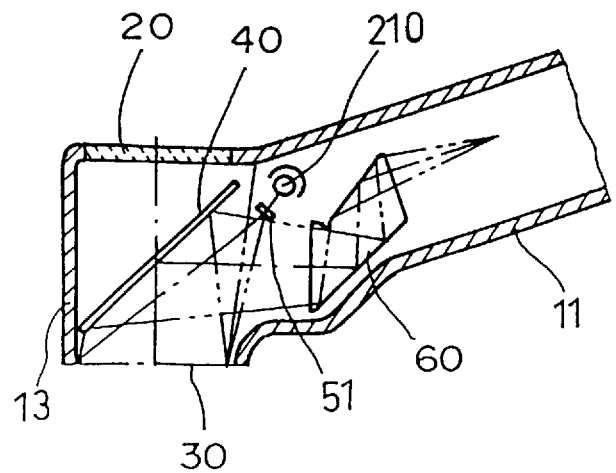
FIG. 9 is a cross-sectional view of a fourth embodiment of a bar code reader.

FIG. 9 shows a fourth embodiment of a bar code reader 200 to which the present invention is applied. The bar code reader 200 is the same as the bar code reader 100 of the third embodiment except that the first and second LEDs 150, 110 are replaced by a two-wavelength type of cold-cathode tube 210 which emits two types of light, i.e., green light having a wavelength of about 520 nm and also red light having a wavelength of about 650 nm, and that the switch 92 (not shown) of this fourth embodiment is a regular ON/OFF switch, i.e., turned ON when depressed or OFF when not depressed, whereas the switch 92 of the third embodiment is a two-step switch which is initially half-depressed and subsequently fully-depressed.

Figure 10:
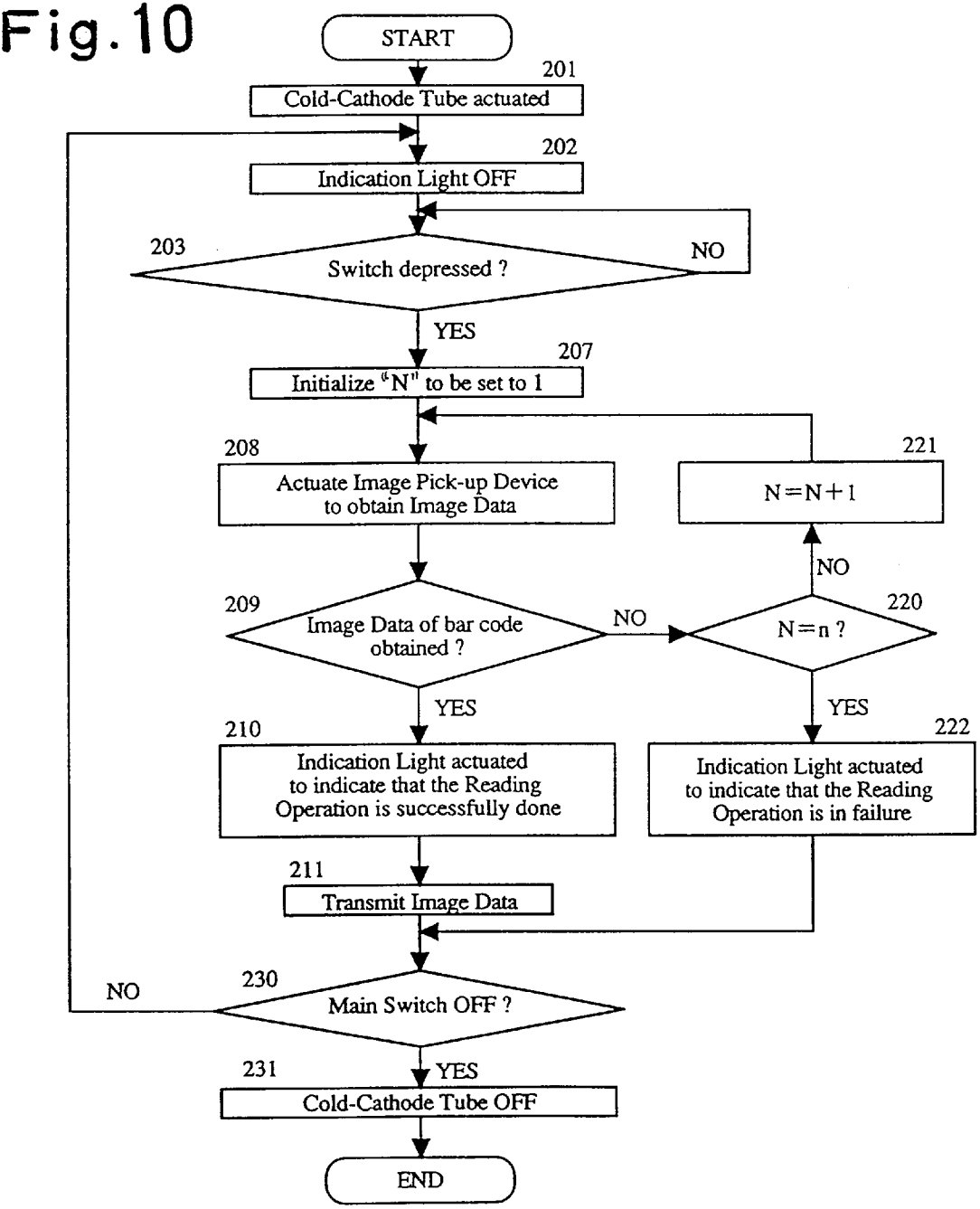
FIG. 10 is a flow chart showing operations performed in the bar code reader of the fourth embodiment.

FIG. 10 is a flow chart showing operations performed in the bar code reader 200. When a main switch (not shown) of the bar code reader 200 is turned ON, the operations shown in FIG. 10 start from step S201. At step S201 the cold-cathode tube 210 is actuated to emit green light, and subsequently, at step S202 the indication light 93 is turned OFF.

At step S203 it is judged whether or not the switch 92 is depressed. Control proceeds to step S207 if it is judged at step S103 that the switch 92 is depressed. The operation of step S203 continues to be performed if it is judged at step S203 that the switch 92 is not yet depressed.

Since the operations performed at step S207 to step S222 are identical to the operations performed at step S107 to step S122, no explanation will be given.

At step S230 it is checked whether or not the main switch of the bar code reader 100 is OFF, and control proceeds to step S231 to turn the cold-cathode tube 210 OFF and subsequently control ends. Control returns to step S202 if it is checked at step S230 that the main switch of the bar code reader 100 is ON.

In the above third embodiment, the half-silvered mirror 40 may be formed as a different type of half-silvered mirror 40 which reflects almost all the light (preferably over about 90 percent (%)) having a wavelength ranging from 620 to 680 nm (650±30 nm) and about 50 percent (%) of light having a wavelength ranging from 490 to 550 nm (520±30 nm) while allowing the remaining part of the light having a wavelength ranging from 490 to 550 nm (520±30 nm) to pass therethrough. With this type of half-silvered mirror 40, a part of the green light emitted from the second LED 110 and having a wavelength ranging from 490 to 550 nm can be used for the reading operation, that is, for illuminating an area surrounded by the opening 30 while the first LED 150 is illuminating the same at the same time during the reading operation, thus the bar code BC can be illuminated by a brighter light.

Figure 11:
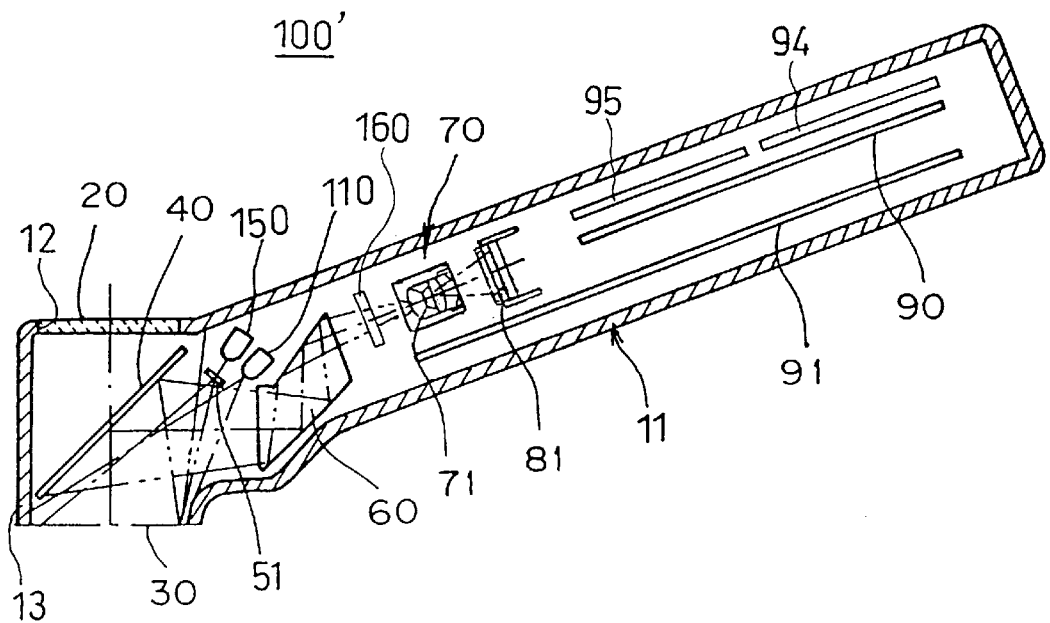
FIG. 11 is a cross-sectional view of a fifth embodiment of a bar code reader.

FIG. 11 shows a fifth embodiment of a bar code reader 100' to which the present invention is applied. The bar code reader 100' is the same as the bar code reader 100 of the second embodiment except that a filter 160 consisting of one or more than one filters is fixedly positioned between the prism 60 and the image forming optical system 70. The filter 160 allows only the light having a wavelength around 650 nm (about 620 to 680 nm) to pass therethrough. With this filter 160, even if a part of ambient light from the transparent plate 20 is incident on the prism 60, all of the light having a wavelength substantially different from 650 nm is intercepted by the filter 160, which prevents image signals obtained by the image pick-up device 81 from suffering from noise and thus prevents the control circuit 94 from having an undesirable processing.

In the above third and fifth embodiments, the first LED 150 is used which emits red light having a wavelength of about 650 nm while the second LED 110 is used which emits green light having a wavelength of about 520 nm. However, different LEDs may be used as long as the wavelength of light emitted from one LED is different from that of light emitted from the other LED. Similarly, in the above fourth embodiment, the cold-cathode tube 210 is used which emits green light having a wavelength of about 520 nm and also red light having a wavelength of about 650 nm, but a different cold-cathode tube may be used as long as the wavelength of one light emitted therefrom is different from that of the other light emitted therefrom.

In the above first through fifth embodiments, the indication light 93 is used for indicating the result of the reading operation of the bar code BC. However, instead of the indication light 93, a different indication device may be used. For instance, a sound generator which generates two types of sound which informs the user of the result of the reading operation being successful or not, respectively, may be used, or another type of sound generator which informs the user of the result of the reading operation by voice.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A data symbol reader, comprising:

a reading head which is positionable on a data symbol to be read, said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a window through which said data symbol can be seen;

a light-splitting optical system positioned between said opening and said window for splitting light incident on said light-splitting optical system which has passed through said opening into two beams of light, such that one of said two beams of light is received by said image pick-up device and that the other of said two beams of light is directed to said window, wherein said one of said two beams of light comprises at least a part of said light emitted by said at least one light emitter;

a converging optical system positioned between said light-splitting optical system and said image pick-up device to converge said one of said two beams of light to be focused on said image pick-up device; and a prism positioned between said light-splitting optical system and said converging optical system to direct said one of said two beams of light to said converging optical system.

2. The data symbol reader according to claim 1, wherein said at least one light emitter consists of a single light emitter.

3. The data symbol reader according to claim 2, wherein said single light emitter is an LED.

4. The data symbol reader according to claim 1, wherein said image pick-up device comprises a CCD line sensor.

5. The data symbol reader according to claim 1, wherein said window comprises a transparent plate.

6. The data symbol reader according to claim 1, wherein said light-splitting optical system splits said light incident on said light-splitting optical system which has passed through said opening into said two beams of light such that a part of said incident light having a wavelength in a predetermined range of length is received by said image pick-up device and a remaining part of said incident light is directed to said window, said part of said incident light comprising at least said part of said light emitted by said at least one light emitter.

7. The data symbol reader according to claim 6, wherein said light-splitting optical system comprises a half-silvered mirror which reflects said one of said two beams of light while allowing said other of said two beams of light to pass through said half-silvered mirror.

8. The data symbol reader according to claim 1, further comprising a filter which allows only light having a wavelength in a predetermined range to pass through said filter, said filter being positioned between said prism and said converging optical system.

9. The data symbol reader according to claim 8, wherein said light emitter only emits light having a wavelength in said predetermined range.

10. A data symbol reader comprising:

a reading head which is positionable on a data symbol to be read said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a window through which said data symbol can be seen; and a light-splitting optical system positioned between said opening and said window for splitting light incident on said light-splitting optical system which has passed through said opening into two beams of light, such that one of said two beams of light is received by said image pick-up device and that the other of said two beams of light is directed to said window, wherein said one of said two beams of light comprises at least a part of said light emitted by said at least one light emitter; and a filter which only allows, light having a wavelength in a predetermined range to pass through said filter, said filter being positioned between said light-splitting optical system and said image pick-up device.

11. The data symbol reader according to claim 10, wherein said light emitter only emits light having a wavelength in said predetermined range.

12. A data symbol reader comprising:

a reading head which is positionable on a data symbol to be read, said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a light diffusing member positioned between said light emitter and said opening;

a window through which said data symbol can be seen; and a light-splitting optical system positioned between said opening and said window for splitting light incident on said light-splitting optical system which has passed through said opening into two beams of light, such that one of said two beams of light is received by said image pick-up device and that the other of said two beams of light is directed to said window, wherein said one of said two beams of light comprises at least a part of said light emitted by said at least one light emitter.

13. A data symbol reader comprising:

a reading head which is positionable on a data symbol to be read said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a window through which said data symbol can be seen;

a light-splitting optical system positioned between said opening and said window for splitting light incident on said light-splitting optical system which has passed through said opening into two beams of light, such that one of said two beams of light is received by said image pick-up device and that the other of said two beams of light is directed to said window, wherein said one of said two beams of light comprises at least a part of said light emitted by said at least one light emitter, said at least one light emitting a first light having a wavelength in a first predetermined range, and a second light having a wavelength in a second predetermined range different from said first predetermined range, said one of said two beams of light comprising said first light, said the other of said two beams of light comprising said second light, said light-splitting optical system reflecting said first light while allowing said second light to pass through said light-splitting optical system; and said at least one light emitter comprises a first emitter which emits said first light and a second emitter which emits said second light.

14. The data symbol reader according to claim 13, wherein said light-splitting optical system reflects almost all of said first light and a part of said second light while allowing a remaining part of said second light to pass through said light-splitting optical system.

15. The data symbol reader according to claim 13, wherein each of said first emitter and said second emitter is an LED.

16. A data symbol reader, comprising:

a reading head which is positionable on a data symbol to be read said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a window through which, said data symbol can be seen; and a light-splitting optical system positioned between said opening and said window for splitting light incident on said light-splitting optical system which has passed through said opening into two beams of light, such that one of said two beams of light is received by said image pick-up device and that the other of said two beams of light is directed to said window, wherein said one of said two beams of light comprises at least a part of said light emitted by said at least one light emitter;

said at least one light emitter emitting a first light having a wavelength in a first predetermined range and a second light having a wavelength in a second predetermined range different from said first predetermined range, said one of said two beams of light comprising said first light, said the other of said two beams of light comprising said second light, said light-splitting optical system reflecting said first light while allowing said second light to pass through said light-splitting optical system; and wherein said at least one light emitter selectively emits one of said first light and said second light.

17. The data symbol reader according to claim 16, wherein said at least one light emitter is a cold-cathode tube.

18. The data symbol reader according to claim 13, further comprising a filter which only allows said first light to pass through said filter, said filter being positioned between said light-splitting optical system and said image pick-up device.

19. A data symbol reader, comprising:

a reading head which is positionable on a data symbol to be read, said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a window through which said data symbol can be seen; and a light-splitting optical system positioned between said opening and said window for reflecting a first part of said light emitted by said at least one light emitter which has a wavelength in a first predetermined range while allowing a second part of said light emitted by said at least one light emitter which has a wavelength in a second predetermined range to pass through said light-splitting optical system.

20. The data symbol reader according to claim 19, wherein said light-splitting optical system reflects almost all of said first part of said light and a part of said second part of said light while allowing a remaining part of said second part of said light to pass through said light-splitting optical system.

21. A data symbol reader, comprising:

a reading head which is to be positioned on a data symbol to be read, said reading head being provided with an opening for surrounding said data symbol when said reading head is positioned on said data symbol;

at least one light emitter for emitting light toward said opening to illuminate said data symbol;

an image pick-up divice on which an image of said data symbol illuminated by said at least one light emitter is to be formed;

a see-through window through which said data symbol can be seen; and a light-splitting optical system positioned between said opening and said see-through window for reflecting a first part of said light emitted by said at least one light emitter which has a wavelength in a first predetermined range while allowing a second part of said light emitted by said at least one light emitter which has a wavelength in a second predetermined range to pass through said light-splitting optical system;

wherein said at least one light emitter comprises a first emitter which emits said first part of said light and a second emitter which emits said second part of said light.

22. The data symbol reader according to claim 21, wherein each of said first emitter and said second emitter is an LED.

23. A data symbol reader, comprising:

a reading head which is to be positioned on a data symbol to be read, said reading head being provided with an opening for surrounding said data symbol when said reading head is positioned on said data symbol;

at least one light emitter for emitting light toward said opening to illuminate said data symbol;

an image pick-up device on which an image of said data symbol illuminated by said at least one light emitter is to be formed;

a see-through window through which said data symbol can be seen; and a light-splitting optical system positioned between said opening and said see-through window for reflecting a first part of said light emitted by said at least one light emitter which has a wavelength in a first predetermined range while allowing a second part of said light emitted by said at least one light emitter which has a wavelength in a second predetermined range to pass through said light-splitting optical system;

wherein said at least one light emitter selectively emits said first part of said light or said second part of said light.

24. The data symbol reader according to claim 23, wherein said at least one light emitter is a cold-cathode tube.

25. A data symbol reader, comprising:

a reading head which is to be positioned on a data symbol to be read, said reading head being provided with an opening for surrounding said data symbol when said reading head is positioned on said data symbol;

an image pick-up device on which an image of said data symbol illuminated by said at least one light emitter is to be formed;

a see-through window though which said data symbol can be seen;

a light-splitting optical system positioned between said opening and said see-through window for reflecting a first part of said light emitted by said at least one light emitter which has a wavelength in a first predetermined range while allowing a second part of said light emitted by said at least one light emitter which has a wavelength in a second predetermined range to pass through said light splitting optical system; and a filter which allows only said first part of said light to pass through said filter, said filter being positioned between said light-splitting optical system and said image pick-up device.

26. A data symbol reader, comprising:

at least one light emitter for illuminating a data symbol to be read;

an image pick-up device on which an image of said data symbol illuminated by said at least one light emitter is to be formed;

a light-splitting optical system for splitting light incident on said light-splitting optical system which has passed through an opening into two beams of light, such that one of said two beams of light is received by said image pickup device and that the other of said two beams of light is directed to a window, wherein said one of said two beams of light comprises at least a part of said light emitted by said at least one light emitter; and said window secured to a casing of said data symbol reader such that said the other of said two beams of light passes through said window.

* * * * *